TRANSISTORIZED HORIZONTAL SWEEP OUTPUT CIRCUIT

Filed April 19, 1960

INVENTOR.
GEORGE H. BALDING
BY Brown, Jackson, Boettcher & Dienner
ATTYS.

United States Patent Office 3,188,517
Patented June 8, 1965

3,188,517

TRANSISTORIZED HORIZONTAL SWEEP OUTPUT CIRCUIT

George H. Balding, Fremont, Calif., assignor, by mesne assignments, to Kaiser Aerospace & Electronics Corporation, Oakland, Calif., a corporation of Nevada Filed Apr. 19, 1960, Ser. No. 23,325
8 Claims. (Cl. 315—27)

The present invention is directed to a novel deflection circuit for effecting the efficient deflection of an electron beam in a cathode ray tube, and specifically to a transistor deflection circuit for use in effecting the horizontal deflection of a beam in cathode ray tubes.

There has been a need in the field for a cathode ray tube deflection circuit which effects the horizontal sweep of an electron beam in a more efficient manner, and particularly for a deflection circuit of such type which is operative with a substantially reduced amount of power. In conventional transistor television sets, for example, 45 or 50 watts may be required to replace the circuit losses which are used in the beam deflection operation, and as a result power supplies of increased size and bulk are required. In addition to the increased expense involved in such structures, in certain applications, such as airborne equipment, the weight and size considerations of the bulky power supplies frequently constitutes a serious problem.

It is a particular object of the present invention therefore to provide a novel cathode ray tube deflection circuit for use in effecting the horizontal sweep of an electron beam in a cathode ray tube which is capable of operation at a reduced voltage with a power supply of a reduced size, and which in itself is comprised of only solid state components to permit the provision of a structure which is of extremely small size and weight.

Various attempts to solve the problem of minimizing the power consumption required for effecting the horizontal sweep of a cathode ray tube electron beam have been described heretofore in the art. One arrangement which has particular merit in certain applications was set forth by Walter B. Guggi in Electronics Magazine, April 1, 1957 (p. 172). In such arrangement, a plurality of low dissipation, on-off switches effect the circulation of energy among various reactive elements in the circuit during the sweep portion of the cycle, and switch the circulating energy into the deflection coil during the retrace period.

As there taught, the system was indicated as being capable of effecting deflection of a beam having a 16 kv. accelerating voltage through an angle of 60 degrees with a 90 degree yoke. However, it was found that in the application of such system in effecting the deflection of a cathode ray electron beam through 110 degrees, the resultant voltages developed in the circuit were such that only a very few semiconductor devices commercially available on the market were rated sufficiently close to the voltage and current requirements of the sweep circuit to permit the consideration thereof for use in such circuit. In each of a number of tests using such semiconductor devices, a short occurred between the collector and emitter element of the device, and it was readily apparent that the known system had little utility in such application with the present state of the component art.

It is a further object of the present invention, therefore, to provide a deflection circuit comprised of solid state components which is capable of effecting the deflection of a cathode ray electron beam through 110 degrees, and it is a specific object of the invention to provide a switching circuit which includes low voltage switching devices and which is operative to effect the switching of a high voltage, high current circuit without damage to the low voltage devices in the switching circuit.

The foregoing objects and features of the invention, and others which are believed to be new and novel in the art, are set forth in the following specification, claims and drawings, in which:

*General description*

Figure 1:
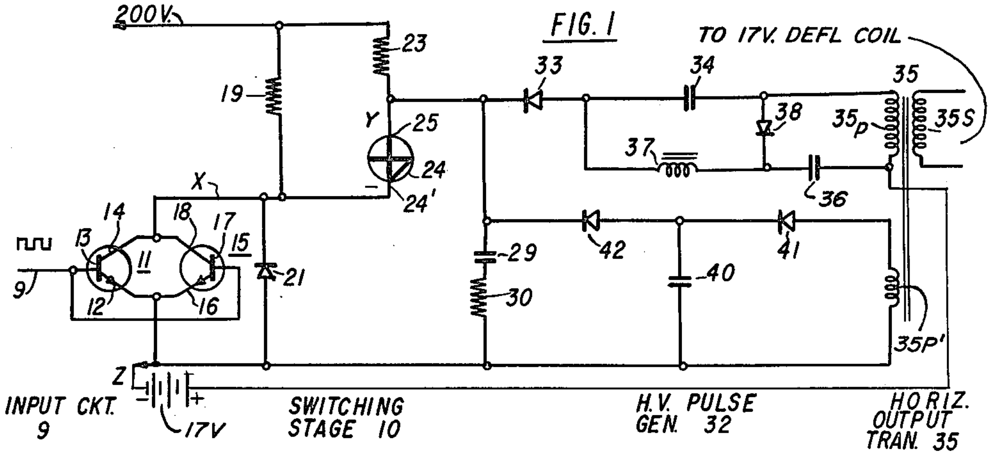
FIGURE 1 is a detailed circuit diagram of one embodiment of the novel horizontal deflection circuit including the novel switching section.

In the generation of a raster on a display screen of a cathode ray tube for the purpose of providing a video display on the phosphor target, it is conventional practice in the television field to start the trace by positioning the beam at the upper left hand corner of the target (relative to the viewer) at the start of each raster trace, and to deflect the beam horizontally to the upper right hand corner of the target to effect the tracing of a horizontal line on the screen. The beam is then "blanked" and returned to the left hand marginal edge to trace a successive line immediately below the previous line trace on the target, the time of return being known in the art and referred to hereinafter as the "flyback" time of the beam. Manifestly, as successive lines are traced across the target in such manner a rectangular raster will be produced on the phosphor target, and suitable modulation of the beam in its raster travel will effect a video display of the information represented by the modulating signals.

The movement of the beam across the screen in such manner is effected in television receivers by horizontal and vertical scanning generators which are in turn controlled by horizontal and vertical sync signals received from the transmitting station. The horizontal scanning generator, for example, is controlled by the sync pulses in a 525 line interlaced system to provide horizontal drive pulses at the rate of 15,750 c.p.s. and the vertical scanning generator is controlled by vertical drive pulses which are generated at the rate of 60 c.p.s.

The resultant drive pulses, such as the horizontal drive pulse, are coupled to a horizontal sawtooth generator which generates a sawtooth wave for coupling to a deflection coil at the horizontal frequency rate to deflect the beam horizontally across the face of the target in a cyclic manner.

The present invention contemplates the provision of a novel circuit comprised of solid state components including semiconductor switching devices which effects the generation of a negative-going sawtooth wave for each horizontal drive pulse which is coupled thereto, such sawtooth wave effecting the sweep of the electron beam from an initial position adjacent one vertical margin of the tube horizontally across the tube target to the opposite margin of the tube target, and for further generating a sawtooth pulse to effect retrace or flyback of the beam to its initial position. The arrangement particularly contemplates a switching circuit of commercially available low-voltage semiconductor switching devices which enable a high voltage, high current semiconductor switch in the control of a high voltage circuit which generates the sweep and flyback pulses for the tube deflection coil.

In the present specification, the terms "high-voltage" and "low-voltage" are used in a relative sense. Thus, in one embodiment of the novel arrangement, a four-layer diode which is rated at approximately 300 volts is identified as a high-voltage, high-current switching device which is connected to couple the high voltage pulse generator circuit to a pair of silicon transistors which have a rating of approximately 100 volts and which are referred to as low voltage switching devices. A voltage limiter means, such as a Zener diode and a supply source are coupled between the high-voltage, high-current semiconductor switch and the low voltage semiconductor switching members to provide the required potential and current for effecting the desired pulse generation while yet maintaining the level of the potential below the value which might cause damage to the low-voltage switching members. In such manner of coupling commercially available low-voltage, silicon diode semiconductor devices may be connected to control a high-voltage, high-current pulse generating circuit to provide energizing signals for effecting the deflection of a cathode ray electron beam 110 degrees, and for effecting flyback of the beam without damaging the components of the circuit.

*Specific circuit description*

With reference to FIGURE 1, the novel circuit as there shown comprises an input circuit 9 which is connected to a source of horizontal drive pulses in a conventional television receiver set (which occur at the horizontal sweep frequency rate of 15,750 c.p.s.) and to a switching stage 10 for the purpose of enabling same in the control of a high voltage pulse generator 32, and particularly to cyclically control the generator 32 in the coupling of sawtooth sweep pulses to the deflection coil (not shown) to effect horizontal beam deflection, and also the generation of retrace pulses to effect flyback of the electron beam after each line trace.

As shown in FIGURE 1, the switching stage 10 comprises a low voltage section which includes a first transistor 11 and a second transistor 15 connected in parallel, which may comprise transistors, which are commercially available and identified by the legend WX1016–D, and which are rated at 200 volts, 7.5 amps.

Transistor units 11, 15 include emitter elements 12, 16, base elements 13, 17 and collector elements 14, 18, respectively, the emitter elements 12, 16 being connected to the negative return of the low voltage power supply (approximately 20 volts in the illustrated embodiment), the base elements 13, 17 being connected to input circuit 9, and the collector elements 14, 18 being connected over load resistor 19 to a 200 volt potential source. Voltage limiter means 21, which may comprise a commercially available Zener diode having a rating of 50 volts, are connected across the low voltage semiconductors 11, 15. The output or collector circuits 14, 18 of transistors 11 and 15 are also connected to a four-layer diode 24, which may be of the type which is commercially available by the designation 4G–200, and which is rated at 200 volts, 10 amps.

The four-layer diode includes a cathode or input circuit 24' which is coupled to the output circuit of the low voltage semiconductors 11, 15, and an anode or output circuit 25 which is connected over resistor 23 to the 200 volt potential source. The output circuit of four-layer diode 24 is also connected to high voltage pulse generator circuit 32, and particularly over diode 33 to a tuned LC circuit including a retrace capacitor 34 and the primary winding 35p of a horizontal output transformer 35, and a loop circuit including capacitor 36 and inductance 37 which are connected across the LC circuit 34, 35, and a blocking diode 38 which is coupled across inductance winding 35p, and capacitor 36.

A second primary winding 35p' comprising a single turn of wire on the transformer 35 has one terminal thereof connected to the ground terminal, and the second terminal thereof connected over diodes 41, 42 to the anode of output circuit of four-layer diode 24, a capacitor 40 being connected between diodes 41, 42 and the 20 volt potential source and an RC network 29, 30 being connected between the anode circuit of four-layer diode 24 and the 20 volt potential source. Secondary winding 35s on the horizontal output transformer 35 is connected to the deflection yoke for the cathode ray tube, which may be any one of a number of commercially available tubes which requires 110 degree beam deflection, such as, for example, an 8YP–4 cathode ray tube.

In operation, the horizontal drive pulses of the television receiver set are coupled over the input circuit 9 to the switching stage 10, and particularly to the base elements 13, 17 of the transistor device 11, 15 to cyclically enable and disable the devices 11, 15 at the horizontal sweep frequency rate (15,750 c.p.s.). One representative horizontal drive pulse is shown in FIGURE 3A and as there shown, the generation of pulses by the generator circuit 32 is controlled by the switching stage 10 in such operation.

It will be recalled that in conventional television receiver circuits the trailing edge of the horizontal drive pulse occurs at the end of the previous line trace by the beam, and the leading edge of such pulse results in the generation of the flyback pulse for the beam. Assuming that the retrace capacitor 34 has a full charge (which is effected in a manner shown in more detail hereinafter), that the beam has completed a trace, and that the leading positive going edge of a horizontal drive pulse is now coupled over input circuit 9 to the base elements 13, 17 of the transistor switches 11, 15, (*t1*, waveform A, FIGURE 3). With the coupling of the positive-going pulse to switches 11, 15 the transistor devices 11, 15 are rendered more conductive, and the potential in the collector circuit (point X) goes negative to establish a potential difference across the control elements for the four-layer diode 24 which is of a value sufficient to effect the conduction thereof.

As four-layer diode 24 conducts, the potential in the anode circuit thereof (point Y) goes negative sufficiently to effect conductivity of diode 33, and a discharge circuit is completed for capacitor 34 which extends from capacitor 34 over diode 33, four-layer diode 24 and the transistor switching members 13, 15, over the potential source and the primary winding 35p to the opposite side of capacitor 34.

Figure 3:
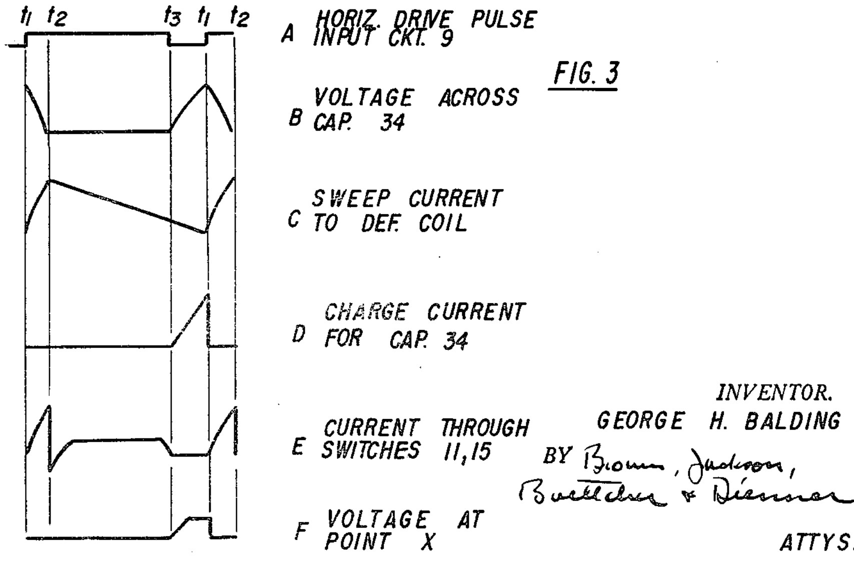
FIGURE 3 is an illustration of the wave-forms which occur at certain stages in the circuit during a single horizontal sweep of the cathode ray tube electron beam.

The discharge of the capacitor voltage which thus appears across the primary winding 35p of horizontal output transformer 35, is coupled to the transformer secondary 35s and constitutes the retrace pulse for effecting retrace or flyback of the beam from its position at the extreme right marginal edge of the target (relative to the viewer) back to the left hand marginal edge for the purpose of preparing same for a subsequent line trace, the nature of the discharge of capacitor 34 being shown in FIGURE 3, waveform B (*t1, t2*), and the resultant sweep current which effects the deflection of the beam in a flyback manner being illustrated in FIGURE 3, waveform C (*t1,t2*).

With the collapsing of the field in the primary winding 35p following discharge of the capacitor 34, a sawtooth wave is generated which effects movement of the beam from the left hand marginal edge of the display to the right hand marginal edge, the nature of the resultant sawtooth wave being illustrated in FIGURE 3, waveform C (*t2, t1*). During the period of field collapse in the primary winding 35p, two independent current components also flow within two branches of the circuit, a sweep current $I_1$ flowing through primary winding *35p*, capacitor 36 and diode 33, and a second smaller current flowing from inductance 37 over capacitor 36, the 20 volt potential source, the transistor switches 11, 15, four-layer diode 24, and diode 33 to inductance 37, to thereby transfer energy from capacitor 36 to inductance 37.

Such energy transfer continues until the trailing edge of the horizontal drive pulse occurs (*t*3) and the switches 11, 15 are driven to cutoff to in turn bias the four-layer diode 24 and diode 33 nonconductive to interrupt the second current path which extends from inductance 37 over capacitor 36, the potential source, switches 11, 15, four-layer diode 24 and diode 33. A current path is now completed from inductance 37 over capacitor 34 and diode 38 to effect a voltage build-up in capacitor 34.

In that retrace capacitor 34 is of a relatively small value, and considerable energy has been stored in inductance 37, a substantial voltage is now established across capacitor 34. In the embodiment set forth in FIGURE 1, it was found that the capacitor was charged to values in the order of 205 volts, which is a value sufficient to effect 110 degree deflection of a cathode ray electron beam. In that the anode circuit of four-layer diode 24 is connected over resistor 23 to a high voltage source, the anode circuit (point Y) rises toward 200 volts as the diode is biased to cutoff, such rise occurring at the same time as the capacitor 34 is charging. In the event that the potential rise at point Y occurs more quickly than the potential rise across capacitor 34, diode 33 will cut off to permit continued charge of the capacitor 34 by the regenerative pulse circuit.

As the leading edge of the next horizontal drive pulse is now received (*t*1), the transistor switches 11, 15 and diodes 24 and 33 are once more rendered conductive to effect the discharge of capacitor 34, and the 200 volt potential charge is released to effect flyback or retrace of the beam back to the left hand marginal edge of the screen. Voltage limiter 21 is operative during each period of conduction of the transistor switches 11, 15 to protect the switches against potential surges which might tend to damage the semiconductors, the diode 21 in the embodiment disclosed herein comprising a 100 volt Zener diode as used with transistor switches WX1016–B and a 50 volt Zener diode when used with transistor switches WX1016–A.

Thus, the four-layer diode which is capable of effecting the switching of the high-voltage pulse generator circuit 32 in the deflection of the cathode ray beam 110 degrees is effectively controlled by low-voltage semiconductor switches, and a 20 volt potential source provides sufficient energy to drive the electron beam in the retrace portion of its trace. As a result, a transistorized switching circuit of high efficiency is provided, and switching of the cathode ray beam through 110 degrees is effected with a minimum of power.

As shown in FIGURE 3E at *t*2, the current through the transistor switches 11, 15 falls to a negative value prior to the establishment of the current flow over the second loop path (inductance 37, capacitor 36, and the switches 11, 15 and four-layer diode 24), and a sharp negative spike occurs which tends to lower the current flow over the four-layer diode to a value which may bias the four-layer diode to cutoff. If such loss of conduction occurs, capacitors 34 and 36 will start to charge, and as a result a full raster might not be obtained. In order to obviate such problem, diode 41 and a primary winding *35p'* consisting of one turn on the horizontal deflection transformer 35 are connected between the collector circuit of four-layer diode 24 and the 20 volt potential supply to thereby provide a holding pulse for the diode during such period to prevent improper operation of the four-layer diode as a result of the occurrence of such transient.

The RC circuit 29, 30 which is connected to the anode circuit of four-layer diode 24 assists in the biasing of same to conduct during the flyback time and the discharge of capacitor 34.

In arrangements in which a power load is not a problem a diode with a resistor in series from +20 may be used in lieu of the additional transformer winding.

Figure 2:
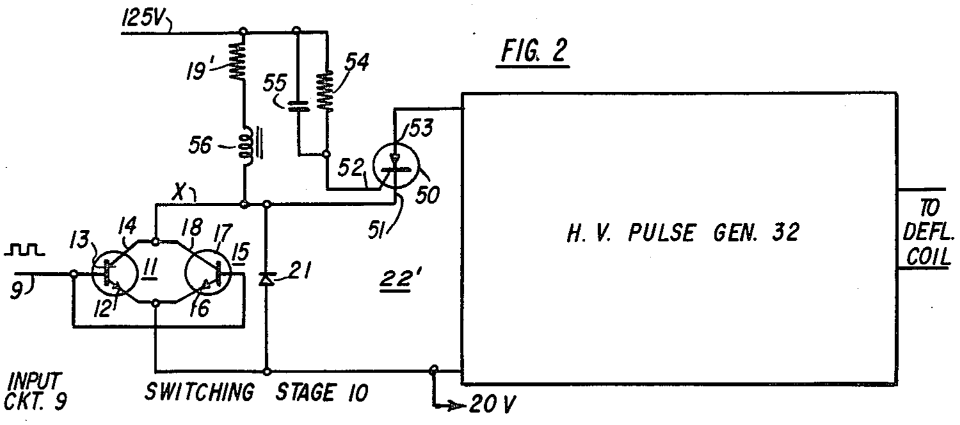
FIGURE 2 is a detailed circuit diagram of the second embodiment of the new horizontal deflection circuit including the novel switching section.

*Specific description of embodiment of FIGURE 2*

In a second embodiment of the invention shown in FIGURE 2, the input circuit 9 is coupled over the switching stage 10 to a high voltage switching stage 22' which includes a silicon controlled rectifier (solid state thyratron) 50, which is commercially available as General Electric C35 BX10 device. Thyratron 50 includes an input circuit 51 which is connected to the output of transistor 11, 15, an anode circuit 53 which is connected to the high voltage generator circuit 32, and a current conducting circuit 52 including an RC network 54, 55, which is coupled to a 125 volt potential source. The collector circuits of the transistor device 11 and 15 are coupled over a 500 microhenry inductance 56 and resistor 19' to the 125 volt potential source.

In such arrangement, as the horizontal drive signal is coupled over the input circuit 9 to enable the switching members 11, 15, the potential at point X decreases to lower the potential on the cathode 51 of the solid state thyratron device 50, and thereby complete a circuit which extends from the 125 volt potential source over RC network 54, 55, gate circuit 52 and the cathode 51 of the thyratron device 50, and the transistor switches 11, 15 to ground.

As the current flow over the gate circuit reaches approximately 10 ma., the anode of the thyratron 50 conducts to effect the discharge of capacitor 34 over thyratron 50 and transistor devices 11, 15 to ground, the primary winding *35p* of the horizontal output transistor 35 to the other side of capacitor 34, and a 205 volt negative pulse is thereby coupled over the primary winding *35p* of the horizontal output transformer 35 to the deflection coil for the cathode ray tube.

As the trailing edge of the horizontal drive signal is coupled to the transistors 11, 15 to bias same to cutoff, the potential at point X rises in the direction of 125 volts by reason of the connection of the collectors over inductance 56 and resistor 19' to the 125 volt source. As the field inductance is deenergized, the collapsing field tends to raise the voltage on the collectors of the transistor switches 11, 15 at a higher rate to effect a more rapid cutoff of the thyratron 50, and to thereby dissipate the storage time of the device by driving the cathode of thyratron 50 more positive than the anode.

As thyratron 50 is rendered nonconductive, the capacitor 34 is charged by the circulating energy of the pulse generating circuit in the manner of the description previously set forth to a value of approximately 205 volts for use in effecting retrace of the electron beam as the leading edge of the subsequent horizontal drive signal is received. It was found that the arrangement set forth in FIGURE 2 was operable with temperature operations in the order of 90 degrees centigrade without utilizing the inductance member 56 and resistance member 19'.

The embodiment of FIGURE 2 is particularly attractive by reason of its ability to operate successfully at temperatures of higher ranges without being subject to improper operation.

While what is described is regarded to be a preferred embodiment of the invention, it will be apparent that variations, rearrangements, modifications and changes may be made therein without departing from the scope of the present invention as defined by the appended claims.

What is claimed is:

1. A high-voltage, high-current switching circuit for controlling a high voltage generator circuit to generate a high voltage pulse from a low voltage source, comprising at least a first semiconductor switching member rated to withstand a relatively low voltage thereacross, a second semiconductor switching member capable of withstanding a potential thereacross which is of a substantially larger value than said low voltage, including at least an input and an output circuit, means for coupling the output circuit of said second switching member to said high voltage generator circuit, and means for coupling the input circuit of said second switching member to the output circuit for said first switching member, and also to a source of potential which is of a lower value than the potential pulse generated by said high voltage generator circuit, and voltage limiter means coupled to the junction of the output circuit of said first switching member and the output circuit of said second switching member and to said source of potential in parallel with said first switching member to provide an arrangement in which a low voltage semiconductor switching device controls the switching of a high voltage generator circuit.

2. An arrangement as set forth in claim 1 in which said high voltage generator circuit includes an output transformer for coupling the generated high voltage pulses to associated equipment, and a pulse derivation winding on said output transformer for deriving a pulse therefrom with each energization of said transformer, rectifier means for rectifying the derived pulse, and means for coupling the derived pulse to said second switching member to maintain said second switching member operative during the generation of the high voltage pulse.

3. A high-voltage, high-current switching circuit for controlling a high voltage generator circuit to generate a high voltage pulse from a low voltage source, comprising at least a first transistor switching member rated to withstand a relatively low voltage thereacross, a second switching member comprising a four-layer diode semiconductor capable of withstanding a potential thereacross which is of a substantially larger value than said low voltage, including at least a first and second control element, means for coupling one control element of said four-layer diode member to said high voltage generator circuit, and means for coupling a second element of said four-layer diode member to the output circuit for said transistor switching member, and also to a source of potential which is of a lower value than the potential pulse generated by said high voltage generator circuit, and voltage limiter means coupled to the junction of the output circuit of said transistor switching member and the second control element of said second switching member in parallel with said first switching member to provide a circuit in which a low voltage switching transistor device controls the switching of a high voltage generator circuit.

4. A high-voltage, high-current switching circuit for controlling a high voltage generator circuit to generate a high voltage pulse from a low voltage source, comprising at least a first switching member rated to withstand a relatively low voltage thereacross, a second switching member comprising a solid state thyratron semiconductor member capable of withstanding a potential thereacross which is of a substantially larger value than said low voltage, including at least a first, a second and a third control element, means for coupling one control element of said second switching member to said high voltage generator circuit, means for coupling a second element of said second switching member to the output circuit for said first switching member, and also to a source of potential which is of a lower value than the potential pulse generated by said high voltage generator circuit and means for coupling the third control element over a circuit to a potential source, and voltage limiter means coupled to the junction of the output circuit of said first switching member and the second control element of said high voltage device in parallel with said first switching member to provide a circuit in which a low voltage switching device controls the switching of a high voltage generator circuit.

5. A high-voltage, high-current switching circuit for controlling a high voltage generator circuit to generate at least a first high voltage pulse from a low voltage source to effect deflection of an electron beam in a cathode ray tube and a second high voltage pulse from such source for effecting retrace of said beam, said switching circuit comprising at least a first switching member rated to withstand only a relatively low voltage thereacross including an input circuit over which drive pulses are received, a second switching member capable of withstanding a potential thereacross which is of a substantially larger value than said low voltage including means for coupling said second switching member between an output circuit for said first switching member and an input circuit for said high voltage generator circuit, said first switching member being operative responsive to the coupling of a drive pulse thereto to energize said second switching member to control said high voltage generator circuit in the generation of a high voltage flyback pulse and a sweep pulse, and to control the high voltage generator circuit in the absence of a drive pulse to prepare for the generation of the next set of pulses; and limiter means for maintaining the output circuit of said first switching member at a potential which is lower than the value of the potential pulse generated by the high voltage circuit.

6. A high-voltage, high-current switching circuit for controlling a high voltage generator circuit to generate at least a first and a second high voltage pulse from a low voltage source, said second pulse being generated to the discharge of a capacitor over a path including an inductance member, and said first pulse being generated during the collapse of the field in said inductance member, said switching circuit comprising at least a first switching member rated to withstand only a relatively low voltage thereacross including an input circuit over which drive pulses are received, a second switching member coupled in series with said first switching member to said high voltage generator circuit, said second switching member being capable of withstanding a potential thereacross which is of a substantially larger value than said low voltage, said first switching member being operative responsive to the coupling of a drive pulse thereto to energize said second switching member to complete said discharge path over said first and second switching members and said inductance member in series to effect the successive generation of said first and second high voltage pulses by said generator circuit, and being operative to control the high voltage generator circuit in the absence of a drive pulse to charge said capacitor for the generation of the next set of pulses, and voltage limiter means coupled in parallel with said first switching member.

7. A circuit as set forth in claim 6 which includes transient protection means connected to said second switching member to provide a holding potential to the second switching member to maintain the second switching member conductive during the period in which said second high voltage pulse is generated.

8. A high voltage, high current switching circuit for controlling a high voltage generator circuit to generate a high voltage pulse from a low voltage source, comprising at least a first switching member rated to withstand a relatively low voltage thereacross, a second switching member comprising a silicon controlled rectifier capable of withstanding a potential thereacross which is of a substantially larger value than said low voltage, including at least an anode and a cathode element, means for coupling said anode element to said high voltage generator circuit, and means for coupling said cathode element to the output circuit of said first switching member, and also to a source of potential which is of a lower value than the potential pulse generated by said high voltage generator circuit, and voltage limiter means coupled in parallel with said first switching member to provide a circuit in which a low voltage switching device controls the switching of a high voltage generator circuit.

References Cited by the Examiner

UNITED STATES PATENTS

| | | | |
|---|---|---|---|
| 2,747,136 | 5/56 | Herzog | 315—27 |
| 2,896,115 | 7/59 | Guggi | 315—27 |
| 2,995,679 | 8/61 | Skoyles | 315—29 |
| 3,034,013 | 5/62 | Bourget | 315—27 |
| 3,040,194 | 6/62 | Jones et al. | 307—88.5 |
| 3,066,229 | 11/62 | Cody | 307—88.5 |

OTHER REFERENCES

Applications and Circuit, August 1959, Design Notes, Bulletin D 420–02–8–59, pp. 22 and 24, title: "A Survey of Some Circuit Applications of the Silicon Controlled Switch and Silicon Controlled Rectifier"; Solid State Products, Inc., publication, RCA Technical Note No. 260, July 6, 1959.

DAVID G. REDINBAUGH, *Primary Examiner.*

ARTHUR GAUSS, ROY LAKE, ROBERT SEGAL, *Examiners.*